United States Patent
Pezeshki et al.

(10) Patent No.: US 11,659,408 B2
(45) Date of Patent: May 23, 2023

(54) INDICATING BEAM PATTERN INFORMATION CORRESPONDING TO A COMPARISON BETWEEN SYNCHRONIZATION SIGNAL BLOCK BEAMS

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/234,401

(22) Filed: Apr. 19, 2021

(65) Prior Publication Data

US 2022/0338020 A1    Oct. 20, 2022

(51) Int. Cl.
| | |
|---|---|
| *H04W 4/00* | (2018.01) |
| *H04W 16/28* | (2009.01) |
| *G06N 20/00* | (2019.01) |
| *H04B 7/06* | (2006.01) |
| *H04B 7/08* | (2006.01) |
| *H04W 56/00* | (2009.01) |

(52) U.S. Cl.
CPC ............ *H04W 16/28* (2013.01); *G06N 20/00* (2019.01); *H04B 7/0617* (2013.01); *H04B 7/0888* (2013.01); *H04W 56/001* (2013.01)

(58) Field of Classification Search
CPC .. H04W 16/28; H04W 56/001; H04B 7/0617; H04B 7/0888
See application file for complete search history.

(56) References Cited

U.S. PATENT DOCUMENTS

| | | | |
|---|---|---|---|
| 11,191,013 B1* | 11/2021 | Kalkunte | H04W 72/0453 |
| 2019/0068265 A1* | 2/2019 | Lee | H04B 7/0874 |
| 2020/0112978 A1* | 4/2020 | Zhang | H04W 48/16 |
| 2020/0153500 A1* | 5/2020 | Kim | H04W 72/0426 |
| 2020/0169347 A1* | 5/2020 | Cho | H04W 56/001 |

(Continued)

FOREIGN PATENT DOCUMENTS

| | | | |
|---|---|---|---|
| WO | WO-2020214168 A1 | 10/2020 | |
| WO | WO-2021032267 A1 | 2/2021 | |
| WO | WO-2021064277 A1 * | 4/2021 | ........... H04B 7/0623 |

OTHER PUBLICATIONS

International Search Report and Written Opinion—PCT/US2022/071001—ISA/EPO—dated Jun. 20, 2022.

*Primary Examiner* — Chi H Pham
*Assistant Examiner* — Elisabeth Benoit Magloire
(74) *Attorney, Agent, or Firm* — QUALCOMM Incorporated

(57) ABSTRACT

Various aspects of the present disclosure generally relate to wireless communication. In some aspects, a user equipment (UE) may receive a differential beam pattern indication that indicates beam pattern information corresponding to a comparison between a first synchronization signal block (SSB) beam pattern associated with a first transmit receive point (TRP) and a second SSB beam pattern associated with a second TRP. The UE may receive an SSB associated with the second TRP based at least in part on the differential beam pattern indication. Numerous other aspects are described.

30 Claims, 10 Drawing Sheets

(56) References Cited

U.S. PATENT DOCUMENTS

| | | |
|---|---|---|
| 2020/0314791 A1 | 10/2020 | Akkarakaran et al. |
| 2021/0036752 A1* | 2/2021 | Tofighbakhsh ...... H04B 7/0695 |
| 2021/0037486 A1* | 2/2021 | Li ...................... H04B 7/15542 |
| 2021/0266215 A1* | 8/2021 | Park ...................... H04L 5/0044 |
| 2021/0306864 A1* | 9/2021 | Park ...................... H04W 16/28 |

* cited by examiner

INDICATING BEAM PATTERN INFORMATION CORRESPONDING TO A COMPARISON BETWEEN SYNCHRONIZATION SIGNAL BLOCK BEAMS

FIELD OF THE DISCLOSURE

Aspects of the present disclosure generally relate to wireless communication and to techniques and apparatuses for indicating beam pattern information corresponding to a comparison between synchronization signal block beams.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors, coupled to the memory, configured to: receive a differential beam pattern indication that indicates beam pattern information corresponding to a comparison between a first synchronization signal block (SSB) beam pattern associated with a first transmit receive point (TRP) and a second SSB beam pattern associated with a second TRP; and receive an SSB associated with the second TRP based at least in part on the differential beam pattern indication.

In some aspects, a base station for wireless communication includes a memory; and one or more processors, coupled to the memory, configured to: receive an indication that a UE has switched from communicating with a first TRP to communicating with a second TRP; and transmit a differential beam pattern indication that indicates beam pattern information corresponding to a comparison between a first SSB beam pattern associated with the first TRP and a second SSB beam pattern associated with the second TRP.

In some aspects, a method of wireless communication performed by a UE includes receiving a differential beam pattern indication that indicates beam pattern information corresponding to a comparison between a first SSB beam pattern associated with a first TRP and a second SSB beam pattern associated with a second TRP; and receiving an SSB associated with the second TRP based at least in part on the differential beam pattern indication.

In some aspects, a method of wireless communication performed by a base station includes receiving an indication that a UE has switched from communicating with a first TRP to communicating with a second TRP; and transmitting a differential beam pattern indication that indicates beam pattern information corresponding to a comparison between a first SSB beam pattern associated with the first TRP and a second SSB beam pattern associated with the second TRP.

In some aspects, a non-transitory computer-readable medium storing a set of instructions for wireless communication includes one or more instructions that, when executed by one or more processors of a UE, cause the UE to: receive a differential beam pattern indication that indicates beam pattern information corresponding to a comparison between a first SSB beam pattern associated with a first TRP and a second SSB beam pattern associated with a second TRP; and receive an SSB associated with the second TRP based at least in part on the differential beam pattern indication.

In some aspects, a non-transitory computer-readable medium storing a set of instructions for wireless communication includes one or more instructions that, when executed by one or more processors of a base station, cause the base station to: receive an indication that a UE has switched from communicating with a first TRP to communicating with a second TRP; and transmit a differential beam pattern indication that indicates beam pattern information corresponding to a comparison between a first SSB beam pattern associated with the first TRP and a second SSB beam pattern associated with the second TRP.

In some aspects, an apparatus for wireless communication includes means for receiving a differential beam pattern indication that indicates beam pattern information corresponding to a comparison between a first SSB beam pattern associated with a first TRP and a second SSB beam pattern associated with a second TRP; and means for receiving an SSB associated with the second TRP based at least in part on the differential beam pattern indication.

In some aspects, an apparatus for wireless communication includes means for receiving an indication that a UE has switched from communicating with a first TRP to communicating with a second TRP; and means for transmitting a differential beam pattern indication that indicates beam pattern information corresponding to a comparison between a first SSB beam pattern associated with the first TRP and a second SSB beam pattern associated with the second TRP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
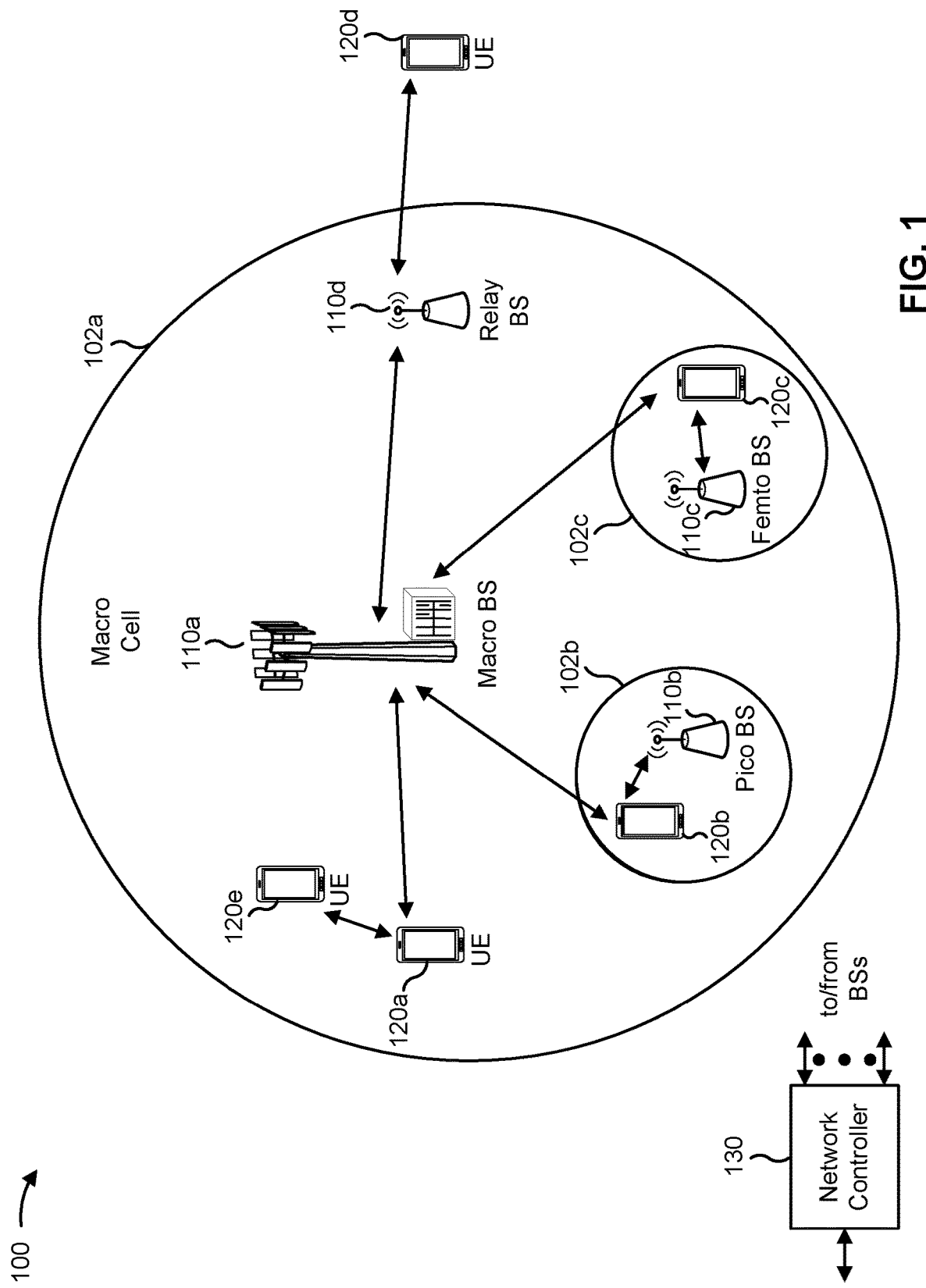
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
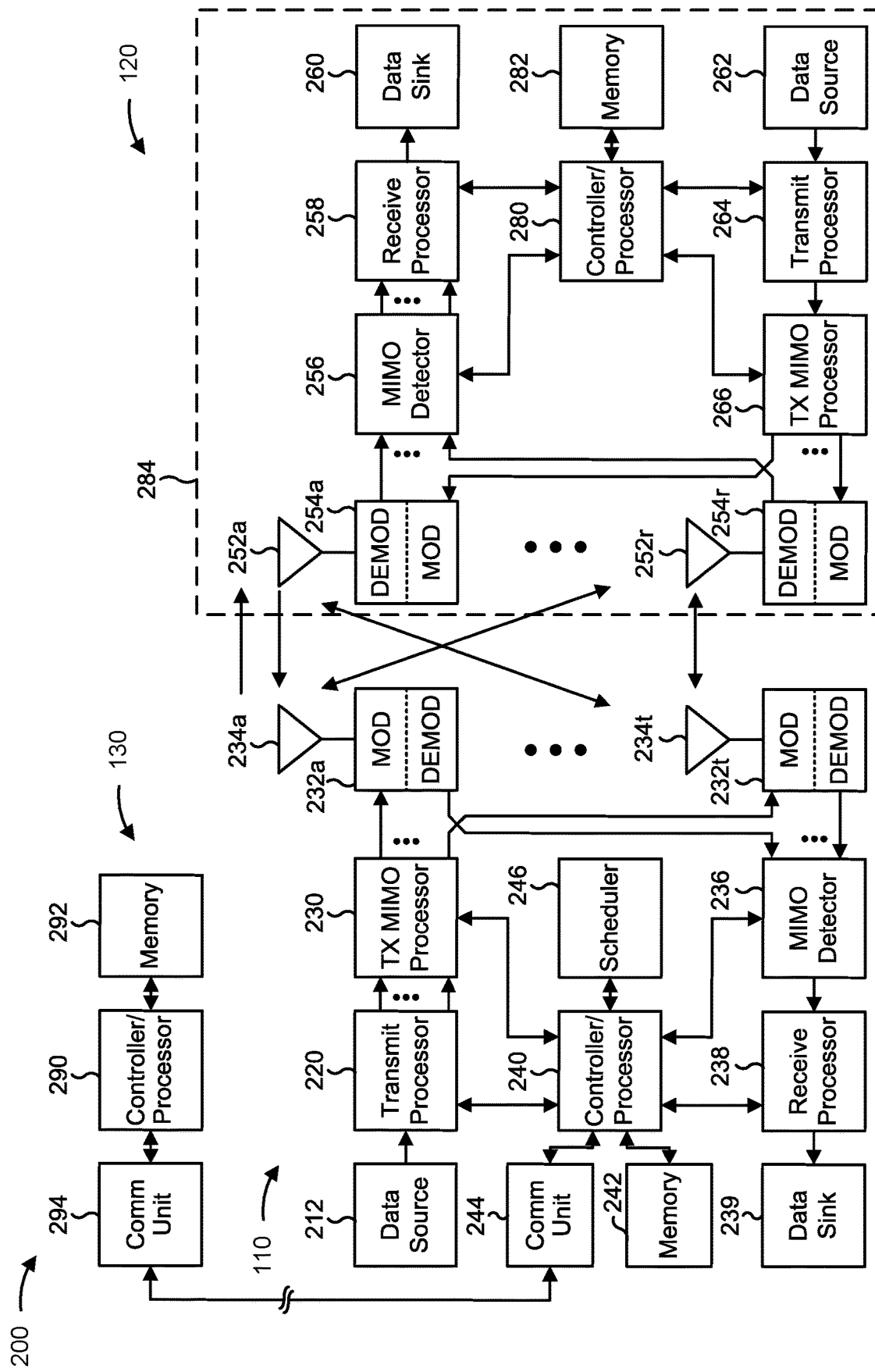
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding resource set (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with indicating beam pattern information corresponding to a comparison between synchronization signal block (SSB) beams, as described in more detail elsewhere herein. In some aspects, the TRP described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for receiving a differential beam pattern indication that indicates beam pattern information corresponding to a comparison between a first SSB beam pattern associated with a first TRP and a second SSB beam pattern associated with a second TRP; or means for receiving an SSB associated with the second TRP based at least in part on the differential beam pattern indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving an indication that a UE has switched from communicating with a first TRP to communicating with a second TRP; or means for transmitting a differential beam pattern indication that indicates beam pattern information corresponding to a comparison between a first SSB beam pattern associated with the first TRP and a second SSB beam pattern associated with the second TRP. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
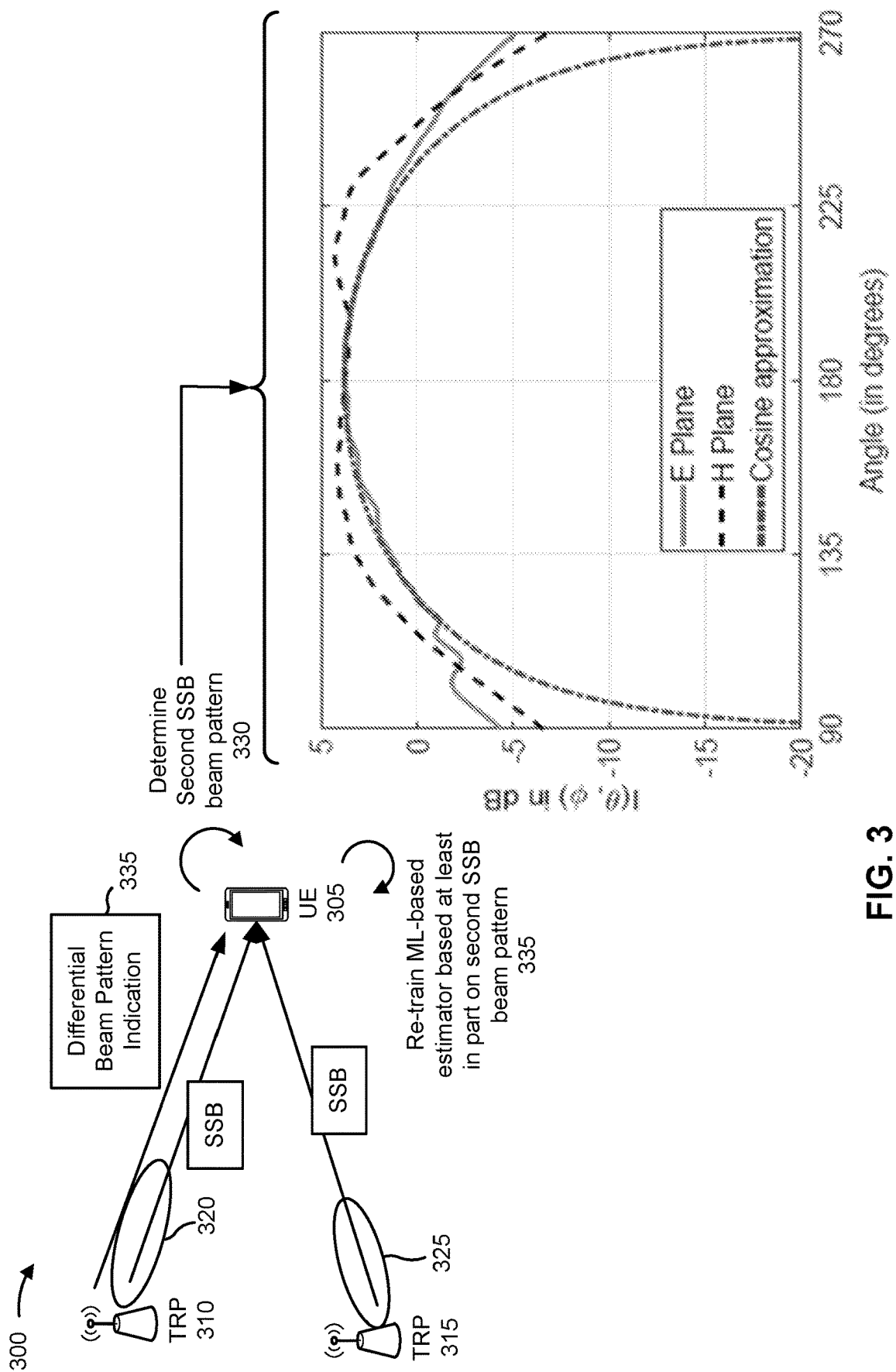
FIG. 3 is a diagram illustrating an example of multiple transmit receive point (TRP) communications, in accordance with the present disclosure.

FIG. 3 is a diagram illustrating an example 300 of multiple TRP communications, in accordance with the present disclosure. As shown, a UE 305 may communicate with a TRP 310 and a TRP 315. The UE 305 may be, or be similar to, the UE 120 described above in connection with FIG. 1.

A TRP 310 and/or 315 may be a distributed unit (DU) of a distributed radio access network (RAN). In some aspects, a TRP 310 and/or 315 may correspond to a base station 110 described above in connection with FIG. 1. For example, different TRPs 310 and/or 315 may be included in different base stations 110. Additionally, or alternatively, multiple TRPs 310 and/or 315 may be included in a single base station 110. In some cases, a TRP 310 and/or 315 may be referred to as a cell, a panel, an antenna array, or an array.

A TRP 310 and/or 315 may be connected to a single access node controller or to multiple access node controllers. In some aspects, a dynamic configuration of split logical functions may be present within an architecture of a distributed RAN. For example, a packet data convergence protocol (PDCP) layer, a radio link control (RLC) layer, and/or a medium access control (MAC) layer may be configured to terminate at an access node controller or at a TRP 310 and/or 315.

In some aspects, multiple TRPs 310 and/or 315 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different TCI states, different precoding parameters, and/or different beamforming parameters). In some aspects, a TCI state may be used to indicate one or more QCL relationships. A TRP 310 and/or 315 may be configured to individually (e.g., using dynamic selection) or jointly (e.g., using joint transmission with one or more other TRPs 310 and/or 315) serve traffic to the UE 305.

The multiple TRPs 310 and/or 315 may communicate with the same UE 305 in a coordinated manner (e.g., using coordinated multipoint transmissions) to improve reliability and/or increase throughput. The TRPs 310 and/or 315 may coordinate such communications via an interface between the TRPs 310 and/or 315 (e.g., a backhaul interface and/or an access node controller). The interface may have a smaller delay and/or higher capacity when the TRPs 310 and/or 315 are co-located at the same base station 110 (e.g., when the TRPs 310 and/or 315 are different antenna arrays or panels of the same base station 110), and may have a larger delay and/or lower capacity (as compared to co-location) when the TRPs 310 and/or 315 are located at different base stations 110. The different TRPs 310 and/or 315 may communicate with the UE 305 using different QCL relationships (e.g., different TCI states), different demodulation reference signal (DMRS) ports, and/or different layers (e.g., of a multi-layer communication).

As shown, the TRP 310 may transmit, and the UE 305 may receive, an SSB using a first SSB beam 320. The TRP 315 may transmit, and the UE 305 may receive, an SSB using a second SSB beam 325. In some cases, a first beam pattern associated with the first SSB beam 320 and/or a second beam pattern associated with the second SSB beam 325 may be used by the UE 305 and/or the TRP 310 and/or 315 to facilitate determining positioning information. A beam pattern may include, for example, a beam shape expressed as a function of spatial angles and frequency.

Providing beam pattern information to a network entity sufficient to determine a high accuracy of a beam angle (e.g., within 0.1° in azimuth and/or elevation) can require substantial overhead, especially when providing positioning over such a relatively large bandwidth with a UE 305 having multiple antenna modules.

Beam pattern feedback may be used to help reduce the feedback overhead while maintaining high position determination accuracy. For example, a TRP 310 and/or 315 may provide beam weights and template elemental gain patterns, an elemental gain formula and parameters, and/or template beam patterns with boresight (or steered to other angles) to the UE 305, enabling the UE 305 to determine the beam pattern.

In some cases, the elemental gain pattern of a subset of antenna elements can be provided. In such embodiments, the TRP 310 and/or 315 may provide space- and/or frequency-varying elemental gain patterns in EΘ and EΦ polarizations (or in E and H planes) for one or more antenna elements in the antenna array of the TRP 310 and/or 315 to allow the UE 305 to determine the full beam pattern. As a person of ordinary skill in the art will appreciate, the E plane is a term of art for the plane in which the electric field is dominant. Similarly, the H plane is a term of art for the plane in which the magnetic field is dominant. EΘ and EΦ polarizations, too, are terms of art referring to radiation in a spherical coordinate system. Depending on desired functionality (including desired accuracy) the level of quantization for the elemental gain pattern may vary (e.g., 0.1°, 0.5°, 1°, 2°, 5°, etc.). To further reduce the amount of information used to convey the elemental gain pattern, the TRP 310 and/or 315 may instead convey descriptive aspects of elemental gain pattern such as peak gain, beamwidth at different offset gain values (e.g., 3 dB beamwidth, 5 dB beamwidth, 10 dB beamwidth, etc.) from peak gain as a function of frequency (for some sample frequencies). In some cases, the level of quantization for these descriptive values can vary, depending on desired functionality. This can result in significantly reduced overhead for providing the beam pattern, although accuracy is dependent on quantized sets of data.

In some cases, as shown by reference number 330, the UE 305 may determine a second SSB beam pattern corresponding to the second SSB beam 325. The UE 305 can determine the second SSB beam pattern by using a parametric functional formula that fits the elemental gain for a TRP 310 and/or 315 as a function of spatial angles. In this approach, the parametric formula used may approximate elemental gain across frequency and angle and offer a first order approximation for elemental gain. An example formula is as follows:

$$\text{Elemental gain}(f,\theta) = A(f) * \cos(\theta)^{1.5},$$

where A(f) is a gain factor as a function of frequency f. Other parametric formulas based on patch/dipole or other antenna types also may be used. Different types/classes of devices may utilize different parametric formulas.

As shown in FIG. 3, a graph that plots a cosine approximation (formula (1)) of elemental gain for measured data with a form factor antenna element at 28 GHz may be used by the UE 305 (and/or may represent computations used by the UE 305) to determine the second SSB beam pattern. As can be seen, the cosine approximation provides an accurate first order approximation for E plane and H plane gain values. According to embodiments, true E plane and H plane elemental gain for a given device can be determined by a manufacturer of the device (e.g., in an anechoic chamber) in different conditions (e.g., across different frequencies, temperatures, etc.), and parameters for the parametric formula used to best approximate true elemental gain in the different conditions can be determined and stored in a lookup table. For example, the exponent for the $\cos(\theta)$ term may be 1.5 at one frequency, 1.4 at another, and 1.6 at yet another. Differences between the parametric formula and true elemental gain can be coarsely quantized with fewer bits and fed back along with A(f). In some cases, the receiving device (e.g., UE 305) may know the parametric formula a priori (e.g., if provided via a governing standard or a local/regional regulatory body), or the formula may be provided by the TRP 310 and/or 315. In either case, the TRP 310 and/or 315 can provide relevant parameters to the UE 305 for current and/or expected conditions, enabling the receiving device to determine the elemental gain pattern and beam pattern used by the TRP 310 and/or 315.

Parameters for the formula indicated above can include, for example, the gain factor A(f) for different conditions (frequencies, temperature, etc.). If the exponent also varies under different conditions, it may also be provided. The parameters can be provided by the TRP 310 and/or 315 prior to a positioning session, for example, based on anticipated or expected conditions (frequency, temperature, etc.). Additionally, or alternatively, parameters may be provided during and/or after a positioning session. As noted, the parameters can be provided with the beam weights used by the TRP 310 and/or 315 and the inter-antenna element spacings of the TRP 310 and/or 315 for determination of the beam pattern. In some embodiments, if inter-antenna element spacing is not provided, it may be assumed that inter-antenna element spacing is $\lambda/2$.

As the UE 305 moves between TRPs, the UE 305 may use SSB-based measurements using machine learning assisted approaches for rotation estimation or for other purposes. The SSB-based measurements may depend upon the SSB beam shape corresponding to an SSB transmission. Thus, in some cases, if the SSB beam pattern changes between a first SSB associated with the TRP 310 and a second SSB associated with the TRP 315, the machine learning based estimator may no longer be appropriately trained, as it may have been trained based on an SSB beam pattern associated with the TRP 310. As a result, if the UE 305 does not determine a change in the SSB beam pattern, device functionality may be negatively impacted. In some cases, the UE 305 may determine the SSB beam pattern corresponding to the second SSB by receiving an indication of an absolute beam pattern of the beam used to transmit the second SSB. However, this approach may involve processing power and time consumption that may negatively impact the efficiency of the UE 305.

Some aspects of the techniques and apparatuses described herein may facilitate signaling a differential beam pattern indication corresponding to a comparison between a first SSB beam pattern and a second SSB beam pattern. For example, as shown in FIG. 3, in some aspects, a base station may transmit a differential beam pattern indication 335 to the UE 305. In some aspects, the indication may indicate no change in the SSB beam pattern or that a difference exists between the first and second SSB beam patterns. In some aspects, the indication may indicate the difference between the first SSB beam pattern and the second SSB beam pattern. In this way, a UE may determine the second SSB beam pattern based at least in part on the differential SSB beam pattern indication and an indication of an SSB beam pattern corresponding to the first SSB. As shown by reference number 335, the UE 305 may re-train the machine learning (ML) based estimator based at least in part on the differential SSB beam pattern indication and/or the second SSB beam pattern. As a result, some aspects described herein may reduce processing power and time consumption and have a positive impact on the efficiency of the UE 305.

As indicated above, FIG. 3 is provided as an example. Other examples may differ from what is described with regard to FIG. 3.

Figure 4:
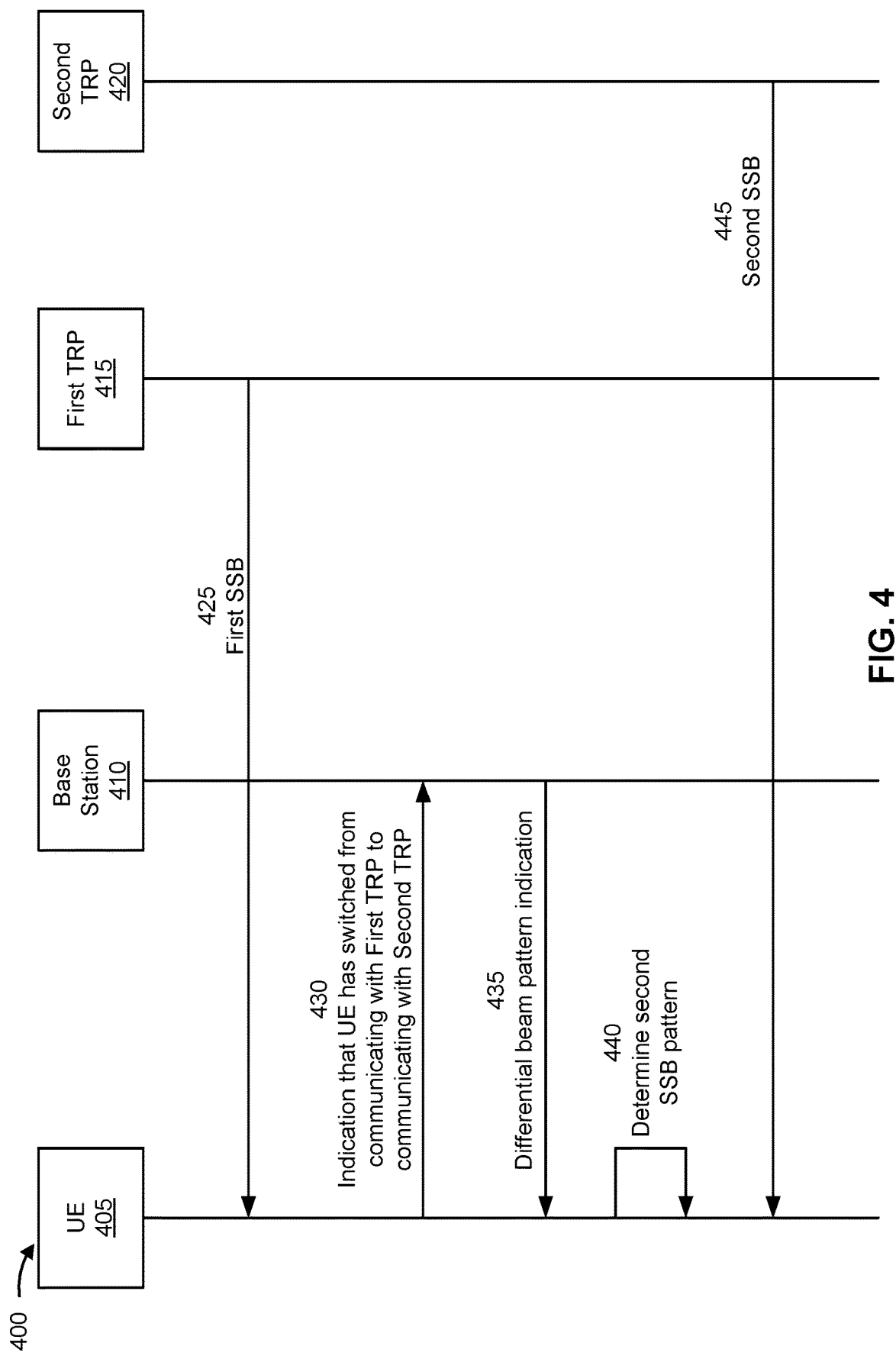
FIGS. 4-6 are diagrams illustrating examples associated with indicating beam pattern information corresponding to a comparison between synchronization signal block (SSB) beams, in accordance with the present disclosure.

FIG. 4 is a diagram illustrating an example 400 associated with indicating beam pattern information corresponding to a comparison between SSB beams, in accordance with the present disclosure. As shown in FIG. 4, a UE 405 may communicate with a base station 410, a first TRP 415, and a second TRP 420. The UE 405 may be, or be similar to, the UE 305 depicted in FIG. 3 and/or the UE 120 depicted in FIGS. 1 and 2. In some aspects, the base station 410 may be associated with at least one of the first TRP 415 or the second TRP 420. In some aspects, the base station may be associated with one of the first TRP 415 or the second TRP 420 and an additional base station (not shown) may be associated with the other of the first TRP or the second TRP.

As shown by reference number 425, the first TRP 415 may transmit, and the UE 405 may receive a first SSB. The first SSB may be transmitted using a first SSB beam having a first SSB beam pattern. In some aspects, the UE 405 may receive an indication of the first SSB beam pattern (e.g., by receiving the first SSB and/or by receiving a separate indication of the first SSB beam pattern).

As shown by reference number 430, the UE 405 may transmit, and the base station 410 may receive, an indication that the UE 405 has switched from communicating with the first TRP 415 to communicating with the second TRP 420. In some aspects, the base station 410 may receive the indication from the first TRP 415, the second TRP 420, and/or a component of the base station 410, among other examples.

As shown by reference number 435, the base station 410 may transmit, and the UE 405 may receive, a differential beam pattern indication. The differential beam pattern indication may indicate beam pattern information corresponding to a comparison between the first SSB beam pattern associated with the first TRP 415 and a second SSB beam pattern associated with the second TRP 420. In some aspects, the beam pattern information may indicate that the second SSB beam pattern is the same as the first SSB beam pattern. In some aspects, the beam pattern information may indicate that the second SSB beam pattern is different than the first SSB beam pattern.

In some aspects, the beam pattern information may indicate a difference between the second SSB beam pattern and the first SSB beam pattern. For example, in some aspects, the beam pattern information may indicate one or more differences associated with one or more beam pattern parameters. The one or more beam pattern parameters may include peak gain, beamwidth (e.g., at one or more offset gain values), frequency, an elemental gain coefficient, A(f), an elemental gain with respect to an elevation plane, an elemental gain with respect to a height plane, and/or a difference between a parametric formula and a true elemental gain, among other examples. In some aspects, as explained further below in connection with FIG. 5, the UE 405 may re-train, based at least in part on the beam pattern information (e.g., the difference between the second SSB beam pattern and the first SSB beam pattern) and/or the second SSB beam pattern, a first machine learning component.

A machine learning component is a software component of a device (e.g., a client device, a server device, a UE, a base station, a TRP, etc.) that performs one or more machine learning procedures and/or that works with one or more other software and/or hardware components to perform one or more machine learning procedures. In one or more examples, a machine learning component may include, for example, software that may learn to perform a procedure without being explicitly trained to perform the procedure. A machine learning component may include, for example, a feature learning processing block (e.g., a software component that facilitates processing associated with feature learning) and/or a representation learning processing block (e.g., a software component that facilitates processing associated with representation learning). A machine learning component may include one or more neural networks, one or more classifiers, and/or one or more deep learning models, among other examples. For example, the first machine learning component may include a machine learning based estimator that may be configured to facilitate rotation estimation and/or positioning estimation, among other examples.

As shown by reference number 440, the UE 405 may determine the second SSB beam pattern based at least in part on the difference between the second SSB beam pattern and the first SSB beam pattern. As shown by reference number 445, the second TRP 420 may transmit, and the UE 405 may receive, a second SSB based at least in part on the differential beam pattern indication (e.g., based at least in part on the determined second SSB beam pattern). In some aspects, a second machine learning component may be used to encode and/or decode differential beam pattern indications. The first and second machine learning components may be alternatively referred to as the second and first machine learning components, respectively, herein in instances in which the machine learning components are discussed in a different order.

In one or more examples, the second machine learning component may be distributed in a network. For example, a server device (e.g., a base station and/or a TRP, among other examples) may provide the second machine learning component (or a portion thereof) to one or more client devices (e.g., a base station, a TRP, and/or a UE, among other examples). The second machine learning component may be trained using cooperative training. In some aspects, for example, the second machine learning component may be trained using federated learning. Federated learning is a machine learning technique that enables multiple clients to collaboratively train machine learning components. In federated learning, a client device may use local training data to perform a local training operation associated with the machine learning component. For example, the client device may use local training data to train the machine learning component. Local training data is training data that is generated by, collected by, and/or stored at the client device.

A client device may generate a local update associated with the machine learning component based at least in part on the local training operation. A local update is information associated with the machine learning component that reflects a change to the machine learning component that occurs as a result of the local training operation. For example, a local update may include the locally updated machine learning component (e.g., updated as a result of the local training operation), data indicating one or more aspects (e.g., parameter values, output values, weights) of the locally updated machine learning component, a set of gradients associated with a loss function corresponding to the locally updated machine learning component, a set of parameters (e.g., neural network weights) corresponding to the locally updated machine learning component, and/or the like.

As indicated above, FIG. 4 is provided as an example. Other examples may differ from what is described with respect to FIG. 4.

Figure 5:
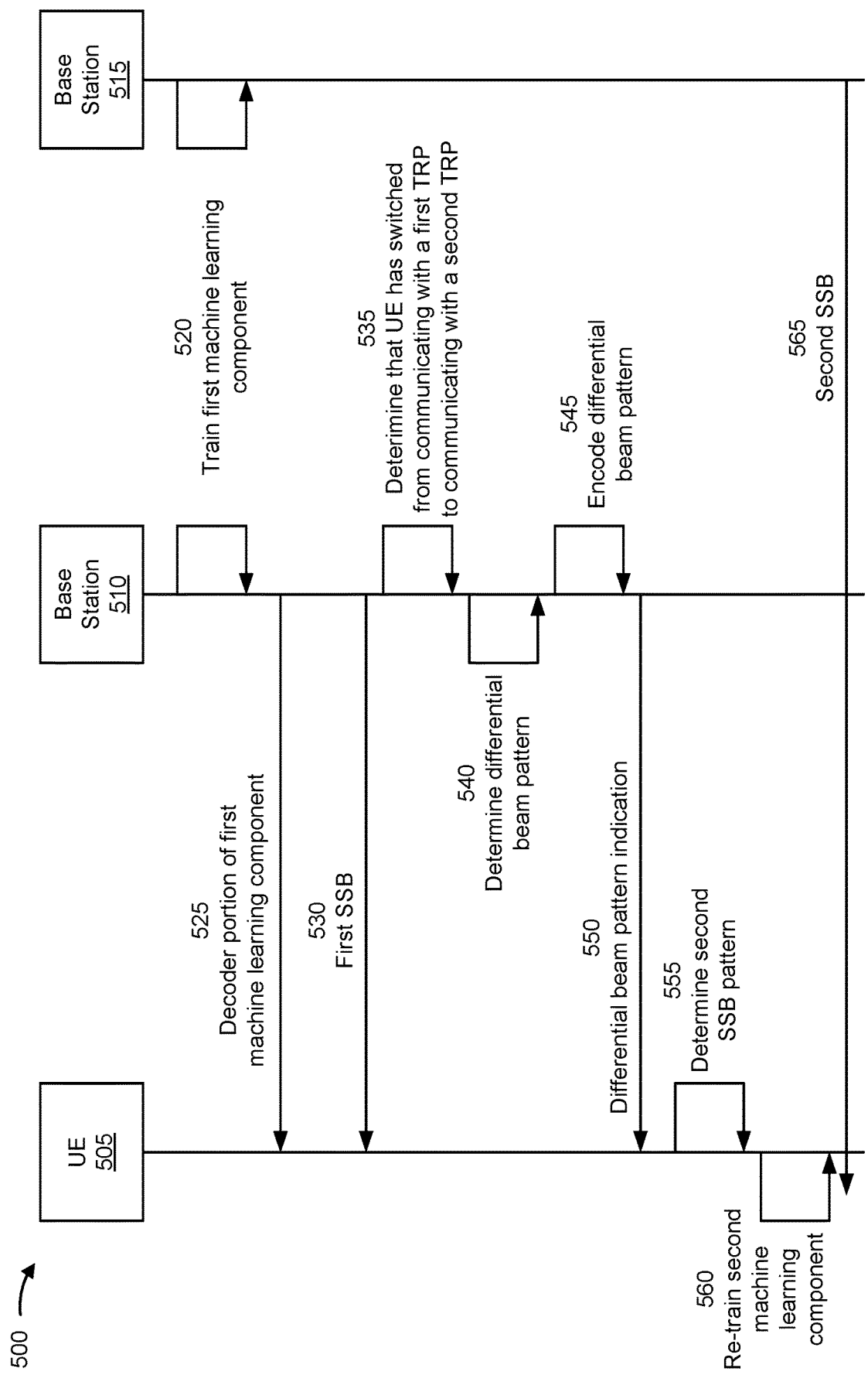

FIG. 5 is a diagram illustrating an example 500 associated with indicating beam pattern information corresponding to a comparison between SSB beams, in accordance with the present disclosure. As shown in FIG. 5, a UE 505 may communicate with a base station 510 and a base station 515. The UE 505 may be, or be similar to, the UE 405 shown in FIG. 4. The base station 510 may be associated with at least one of a first TRP or a second TRP (e.g., the base station 510 may include the first TRP and/or the second TRP). The first TRP may include, or be similar to, the first TRP 415 depicted in FIG. 4 and the second TRP may include, or be similar to, the second TRP 420 depicted in FIG. 4. In some aspects, the base station 510 may be associated with one of the first TRP or the second TRP, and the base station 515 may be associated with the other of the first TRP or the second TRP.

As shown by reference number 520, the base station 510 and/or the base station 515 may train a first machine learning component. In some aspects, the first machine learning component may include an autoencoder. In some aspects, the first machine learning component may be, or be similar to, the second machine learning component described above in connection with FIG. 4. In some aspects, the base station 510 and the base station 515 may train the first machine learning component in cooperation with one another and/or at least one additional base station. For example, in some aspects, a number of base stations may train an autoencoder, use an encoder portion to create embedding, and provide a decoder portion to the UE 405 to use to recover the representation from the embedding. As shown by reference number 525, for example, the base station 510 may transmit, and the UE 505 may receive, a decoder portion of the first machine learning component.

As shown by reference number 530, the base station 510 may transmit a first SSB. The first SSB may be associated with a first TRP that may be associated with the base station 510. As shown by reference number 535, the base station 510 may determine that the UE 505 has switched from communicating with the first TRP to communicating with a second TRP. In some aspects, the base station 510 may determine that the UE 505 has switched based at least in part on an indication received from the UE 505, an indication received from the base station 515, and/or a determination that the UE 505 has failed to communicate with the first TRP for a certain amount of time, among other examples.

As shown by reference number 540, the base station 510 (e.g., in response to determining that the UE 505 has switched from communicating with the first TRP to communicating with the second TRP) may determine a differential beam pattern corresponding to a difference between a first SSB beam pattern associated with the first TRP and a second SSB beam pattern associated with the second TRP. As shown by reference number 545, the base station 510 may encode, using an encoder portion of the first machine learning component, the differential beam pattern. The base station 510 may encode the differential beam pattern to obtain an encoded differential beam pattern.

As shown by reference number 550, the base station 510 may transmit, and the UE 505 may receive, a differential beam pattern indication that indicates beam pattern information corresponding to a comparison between the first SSB beam pattern associated with the first TRP and the second SSB beam pattern associated with the second TRP.

As shown by reference number 555, the UE 505 may determine the second SSB beam pattern based at least in part on the difference between the second SSB beam pattern and the first SSB beam pattern. As shown by reference number 560, the UE 505 may re-train a second machine learning component based at least in part on the beam pattern information. The second machine learning component may be, or be similar to, the first machine learning component described above in connection with FIG. 4. For example, the second machine learning component may include a machine learning based estimator that may be configured to facilitate rotation estimation and/or positioning estimation, among other examples. As shown by reference number 565, the base station 515 may transmit, and the UE 505 may receive a second SSB. The second SSB may be associated with the second TRP and may be transmitted using the second SSB beam having the second SSB beam pattern. The UE 505 may receive and/or decode the second SSB based at least in part on the differential beam pattern indication.

As indicated above, FIG. 5 is provided as an example. Other examples may differ from what is described with respect to FIG. 5.

Figure 6:
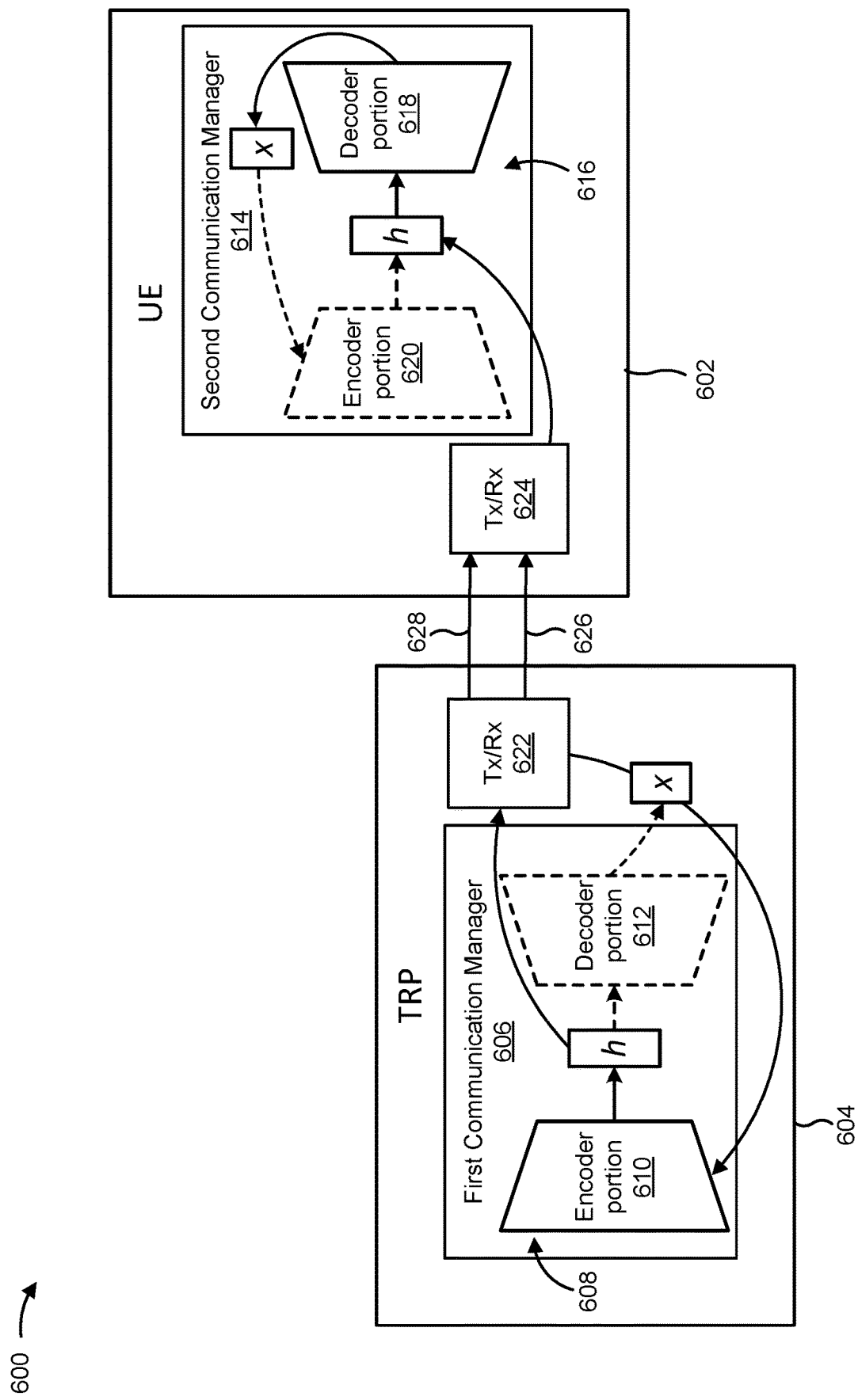

FIG. 6 is a diagram illustrating an example 600 associated with indicating beam pattern information corresponding to a comparison between SSB beams, in accordance with the present disclosure. As shown, a UE 602 may communicate with a TRP 604. The UE 602 and the TRP 604 may communicate with one another via a wireless network (e.g., the wireless network 100 shown in FIG. 1). In some aspects, the UE 602 may be, or be similar to, the UE 505 shown in FIG. 5 and/or the UE 405 shown in FIG. 4. The TRP 604 may be, or be similar to, the TRP 415 and/or the TRP 420 shown in FIG. 4. For example, in some aspects, the TRP 604 may include a base station.

As shown, the TRP 604 may include a first communication manager 606 that may be configured to utilize a machine learning component (shown, for example, as an autoencoder 608) to perform one or more wireless communication tasks. The machine learning component may be, or be similar to, the first machine learning component discussed above in connection with FIG. 5 and/or the second machine learning component discussed above in connection with FIG. 4. The first communication manager 606 may be configured to utilize any number of additional machine learning components not shown in FIG. 6. In some aspects, the communication manager may be, include, or be included in, the determination component 1008 described below in connection with FIG. 10.

As shown, the autoencoder 608 may include an encoder portion 610 configured to receive an observed wireless communication vector, x, and to provide a latent vector, h, as output. The autoencoder 608 also may include a decoder portion 612 configured to receive the latent vector h and to provide the observed wireless communication vector x as output. In some aspects, the observed wireless communication vector x may include a differential SSB beam pattern (e.g., a difference between a first SSB beam pattern and a second SSB beam pattern). The latent vector h may include an encoded differential SSB beam pattern.

As shown in FIG. 6, UE 602 may include a second communication manager 614 that may be configured to utilize a machine learning component (shown, for example, as an autoencoder 616) to perform one or more wireless communication tasks. In some aspects, the second communication manager 614 may be, include, or be included in, the determination component 908 described below in connection with FIG. 9. In some aspects, the autoencoder 616 may correspond to the autoencoder 608. In some aspects, the autoencoder 616 may be a copy of the autoencoder 608. In some aspects, the TRP 604 may include only the encoder portion 610 and/or the UE 602 may include only a decoder portion 618 configured to receive the latent vector h as input and to provide the observed wireless communication vector x as output. The second communication manager 614 may be configured to utilize any number of additional machine learning components not shown in FIG. 6. The autoencoder 616 may include an encoder portion 620 configured to receive the observed wireless communication vector x as input and to provide a latent vector h as output.

As shown in FIG. 6, the TRP 604 may include a transceiver (shown as Tx/Rx 622) that may facilitate wireless communications with a transceiver 624 of the UE 602. As shown by reference number 626, the TRP 604 may transmit, using the transceiver 622, a wireless communication to the UE 602. The wireless communication may include, for example, the decoder portion 618 of the autoencoder 616. The transceiver 624 of the UE 602 may receive the wireless communication. The second communication manager 614 may decode and instantiate the decoder portion 618.

As shown, the first communication manager 606 may provide, as input, the observed wireless communication vector x, to the encoder portion 610 of the autoencoder 608. For example, in some aspects, the observed wireless communication vector x may include a differential beam pattern. The encoder portion 610 of the autoencoder 608 may determine, based at least in part on the observed wireless communication vector x, a latent vector h. The latent vector h may include an encoded differential beam pattern. As shown, the first communication manager 606 may provide the latent vector h to the transceiver 622 for transmission. As shown by reference number 628, the transceiver 622 may transmit, and the transceiver 624 of the UE 602 may receive, the latent vector h.

As shown, the second communication manager 614 of the UE 602 may provide the latent vector h as input to the decoder portion 618 of the autoencoder 616. The decoder portion 618 may determine (e.g., reconstruct) the observed wireless communication vector x based at least in part on the latent vector h. In some aspects, the UE 602 may re-train the decoder portion 618 based at least in part on the observed wireless communication vector x.

In some aspects, for example, the second communication manager 614 of the UE 602 may determine an update corresponding to the autoencoder 616 by training the autoencoder 616. For example, as indicated by the dashed lines associated with the autoencoder 616, the encoder portion 620 may be used, along with training data (e.g., based at least in part on the differential beam pattern), to reconstruct a wireless communication training vector.

As indicated above, FIG. 6 is provided merely as an example. Other examples may differ from what is described with regard to FIG. 6.

Figure 7:
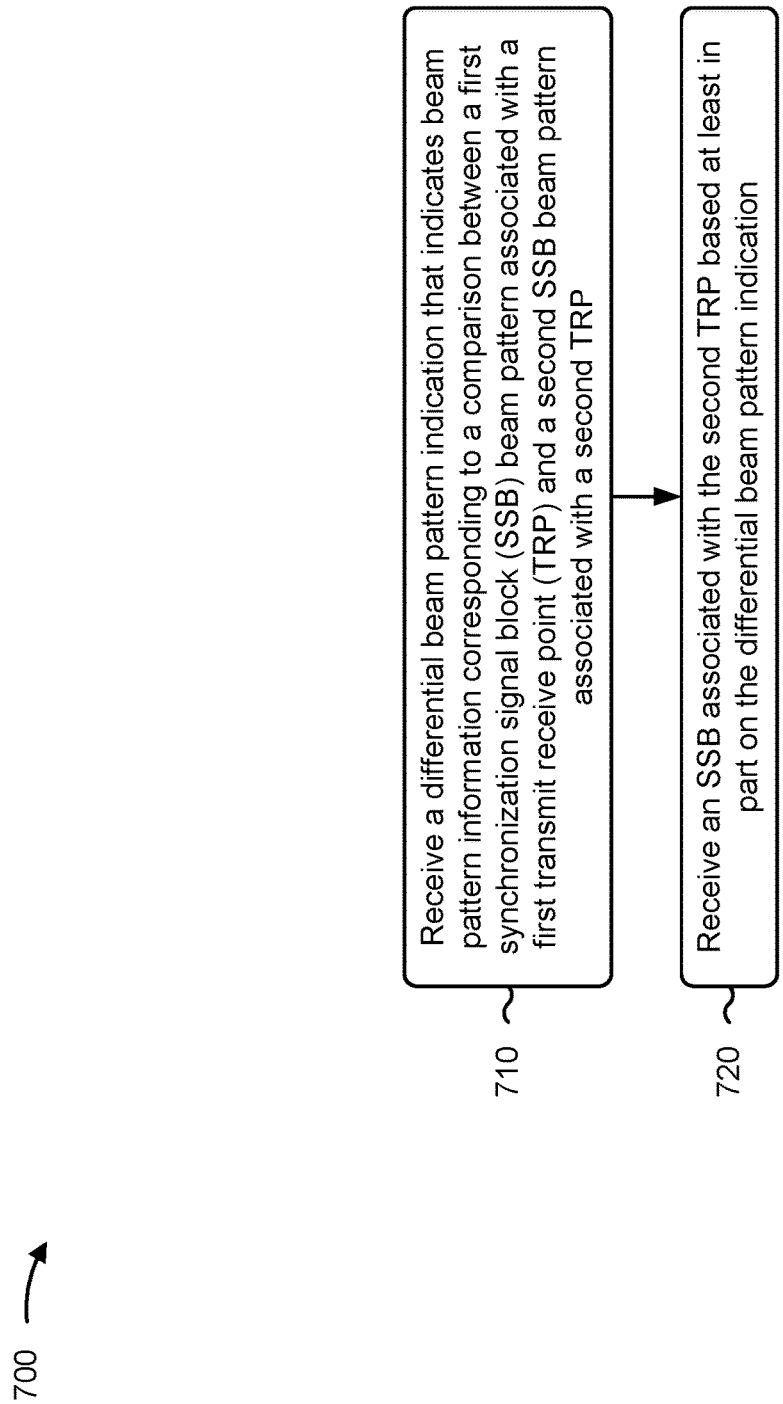
FIGS. 7 and 8 are diagrams illustrating example processes associated with indicating beam pattern information corresponding to a comparison between SSB beams, in accordance with the present disclosure.

FIG. 7 is a diagram illustrating an example process 700 performed, for example, by a UE, in accordance with the present disclosure. Example process 700 is an example where the UE (e.g., UE 405, 505) performs operations associated with indicating beam pattern information corresponding to a comparison between SSB beams.

As shown in FIG. 7, in some aspects, process 700 may include receiving a differential beam pattern indication that indicates beam pattern information corresponding to a comparison between a first SSB beam pattern associated with a first TRP and a second SSB beam pattern associated with a second TRP (block 710). For example, the UE (e.g., using reception component 902, depicted in FIG. 9) may receive a differential beam pattern indication that indicates beam pattern information corresponding to a comparison between a first SSB beam pattern associated with a first TRP and a second SSB beam pattern associated with a second TRP, as described above.

As further shown in FIG. 7, in some aspects, process 700 may include receiving an SSB associated with the second TRP based at least in part on the differential beam pattern indication (block 720). For example, the UE (e.g., using reception component 902, depicted in FIG. 9) may receive an SSB associated with the second TRP based at least in part on the differential beam pattern indication, as described above.

Process 700 may include additional aspects, such as any single aspect or any combination of aspects described below and/or in connection with one or more other processes described elsewhere herein.

In a first aspect, the beam pattern information indicates that the second SSB beam pattern is the same as the first SSB beam pattern.

In a second aspect, the beam pattern information indicates that the second SSB beam pattern is different than the first SSB beam pattern.

In a third aspect, alone or in combination with the second aspect, process 700 includes re-training, based at least in part on the beam pattern information, a trained machine learning component. In some aspects, the trained machine learning component may be, or be similar to, the second machine learning component described above in connection with FIG. 5 and/or the first machine learning component described above in connection with FIG. 4.

In a fourth aspect, alone or in combination with one or more of the second through third aspects, the beam pattern information indicates a difference between the second SSB beam pattern and the first SSB beam pattern.

In a fifth aspect, alone or in combination with the fourth aspect, process 700 includes receiving an indication of the first SSB beam pattern, and determining the second SSB beam pattern based at least in part on the difference between the second SSB beam pattern and the first SSB beam pattern.

In a sixth aspect, alone or in combination with one or more of the first through fifth aspects, process 700 includes receiving a decoder portion of a machine learning component, wherein the beam pattern information comprises an encoded differential beam pattern, and decoding, using the decoder portion of the machine learning component, the encoded differential beam pattern to obtain a differential beam pattern. In some aspects, the decoder portion of the machine learning component may be a decoder portion of a machine learning component that is, or is similar to, the first machine learning component described above in connection with FIG. 5 and/or the second machine learning component described above in connection with FIG. 4.

In a seventh aspect, alone or in combination with the sixth aspect, machine learning component comprises an autoencoder.

In an eighth aspect, alone or in combination with one or more of the first through seventh aspects, receiving the differential beam pattern indication comprises receiving the differential beam pattern indication from a base station.

In a ninth aspect, alone or in combination with the eighth aspect, the base station is associated with at least one of the first TRP or the second TRP.

In a tenth aspect, alone or in combination with one or more of the eighth through ninth aspects, the base station is associated with one of the first TRP or the second TRP, and wherein an additional base station is associated with the other of the first TRP or the second TRP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
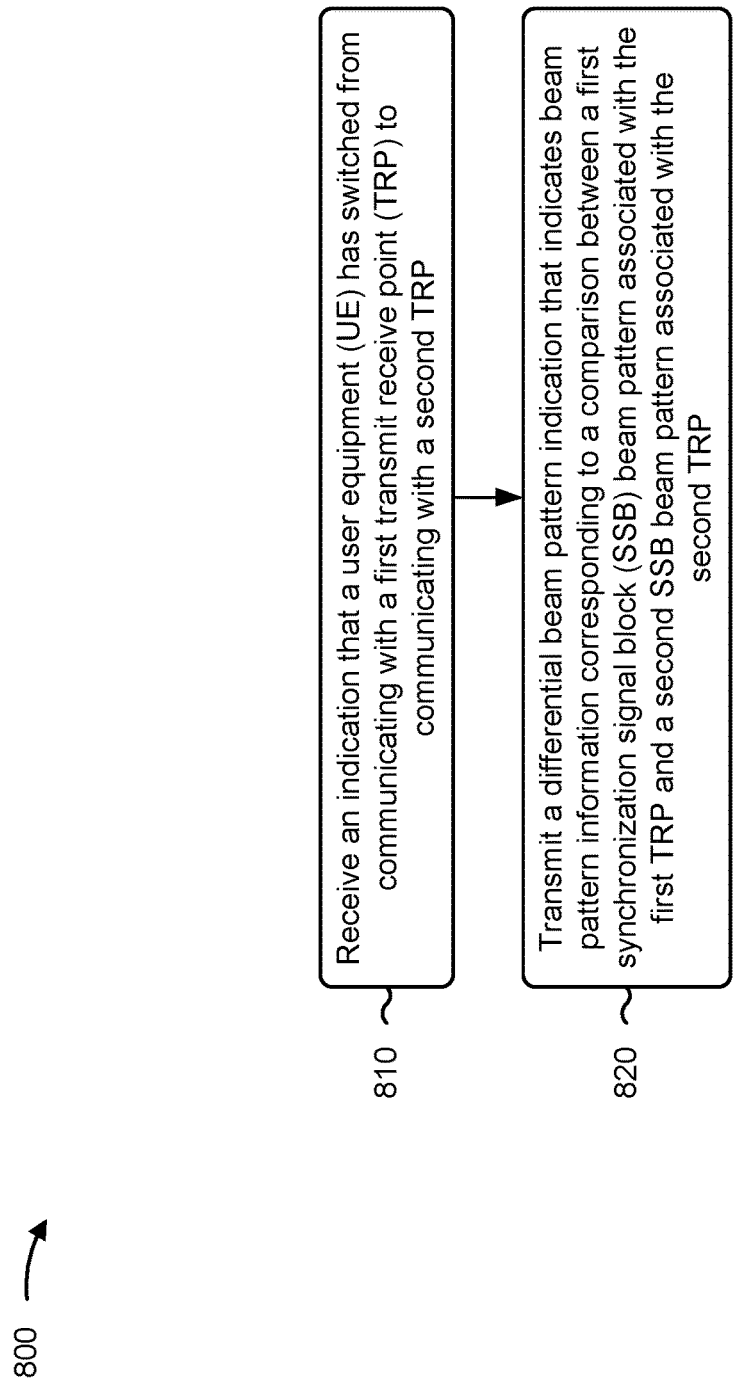

FIG. 8 is a diagram illustrating an example process 800 performed, for example, by a base station, in accordance with the present disclosure. Example process 800 is an example where the base station (e.g., base station 410, 510) performs operations associated with indicating beam pattern information corresponding to a comparison between SSB beams.

As shown in FIG. 8, in some aspects, process 800 may include receiving an indication that a UE has switched from communicating with a first TRP to communicating with a second TRP (block 810). For example, the base station (e.g., using reception component 1002, depicted in FIG. 10) may receive an indication that a UE has switched from communicating with a first TRP to communicating with a second TRP, as described above.

As further shown in FIG. 8, in some aspects, process 800 may include transmitting a differential beam pattern indication that indicates beam pattern information corresponding to a comparison between a first SSB beam pattern associated with the first TRP and a second SSB beam pattern associated with the second TRP (block 820). For example, the base station (e.g., using transmission component 1004, depicted in FIG. 10) may transmit a differential beam pattern indication that indicates beam pattern information corresponding to a comparison between a first SSB beam pattern associated with the first TRP and a second SSB beam pattern associated with the second TRP, as described above.

Process 800 may include additional aspects, such as any single aspect or any combination of aspects described below and/or in connection with one or more other processes described elsewhere herein.

In a first aspect, the beam pattern information indicates that the second SSB beam pattern is the same as the first SSB beam pattern.

In a second aspect, the beam pattern information indicates that the second SSB beam pattern is different than the first SSB beam pattern.

In a third aspect, alone or in combination with the second aspect, the beam pattern information indicates a difference between the second SSB beam pattern and the first SSB beam pattern.

In a fourth aspect, alone or in combination with the third aspect, process 800 includes transmitting an indication of the first SSB beam pattern.

In a fifth aspect, alone or in combination with one or more of the first through fourth aspects, process 800 includes transmitting a decoder portion of a machine learning component, and encoding, using an encoder portion of the machine learning component, a differential beam pattern to obtain an encoded differential beam pattern, wherein the beam pattern information comprises the encoded differential beam pattern. In some aspects, the machine learning component may be, or be similar to, the first machine learning component described above in connection with FIG. 5 and/or the second machine learning component described above in connection with FIG. 4.

In a sixth aspect, alone or in combination with the fifth aspect, the machine learning component comprises an autoencoder.

In a seventh aspect, alone or in combination with one or more of the fifth through sixth aspects, process 800 includes training the machine learning component.

In an eighth aspect, alone or in combination with the seventh aspect, training the machine learning component comprises training the machine learning component in cooperation with at least one additional base station.

In a ninth aspect, alone or in combination with one or more of the first through eighth aspects, the base station is associated with at least one of the first TRP or the second TRP.

In a tenth aspect, alone or in combination with one or more of the first through ninth aspects, the base station is associated with one of the first TRP or the second TRP, and wherein an additional base station is associated with the other of the first TRP or the second TRP.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
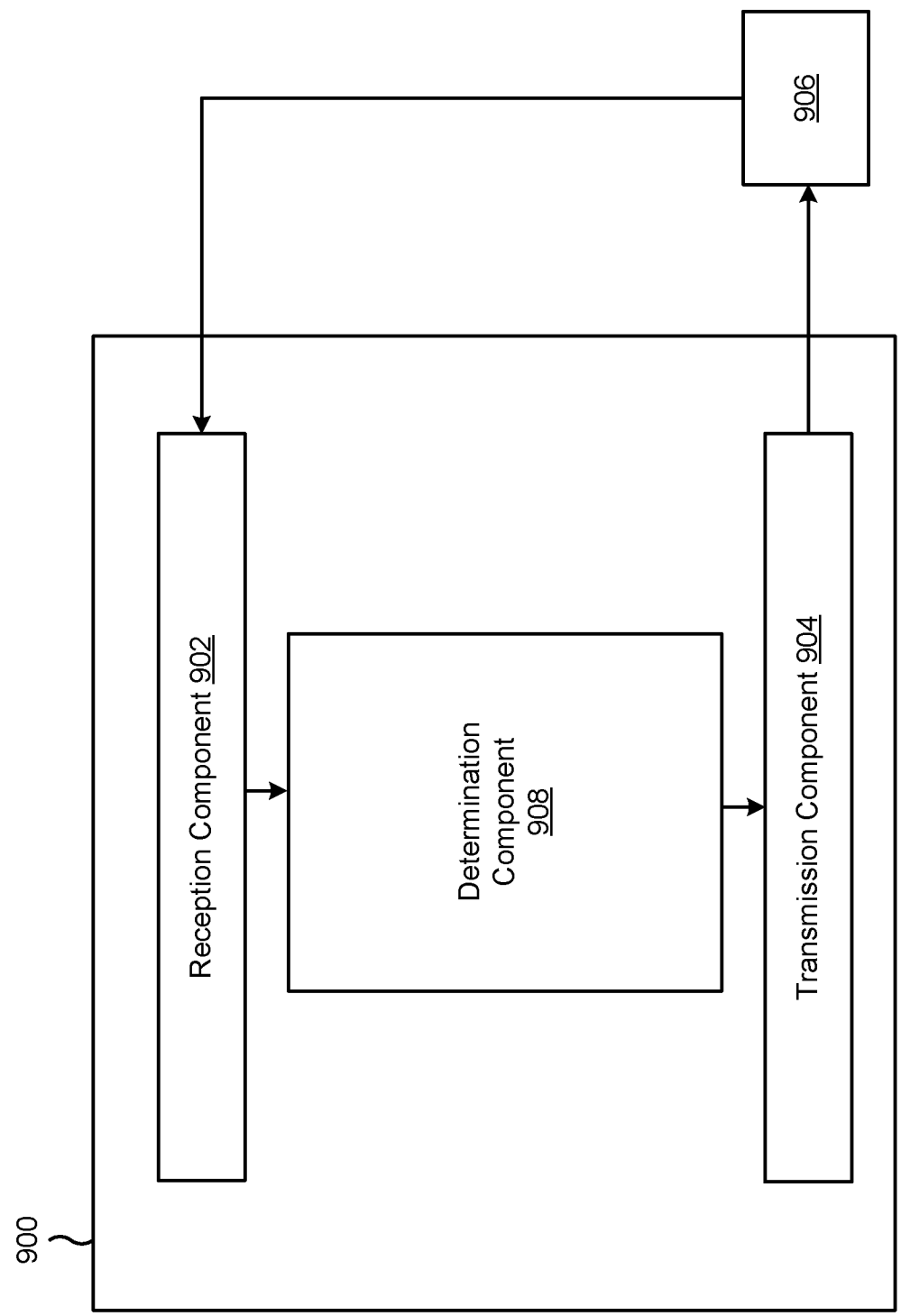
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive a differential beam pattern indication that indicates beam pattern information corresponding to a comparison between a first SSB beam pattern associated with a first TRP and a second SSB beam pattern associated with a second TRP. The reception component 902 may receive an SSB associated with the second TRP based at least in part on the differential beam pattern indication.

The reception component 902 may receive an indication of the first SSB beam pattern. The determination component 908 may determine the second SSB beam pattern based at least in part on the difference between the second SSB beam pattern and the first SSB beam pattern. In some aspects, the determination component 908 may include one or more antennas, a modulator, a transmit MIMO processor, a transmit processor, a controller/processor, a memory, or a combination thereof, of the UE described above in connection with FIG. 2. In some aspects, the determination component 908 may include the reception component 902 and/or the transmission component 904.

The reception component 902 may receive a decoder portion of a machine learning component, wherein the beam pattern information comprises an encoded differential beam pattern. The determination component 908 may decode, using the decoder portion of the machine learning component, the encoded differential beam pattern to obtain a differential beam pattern. The determination component 908 may re-train, based at least in part on the beam pattern information, a trained machine learning component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
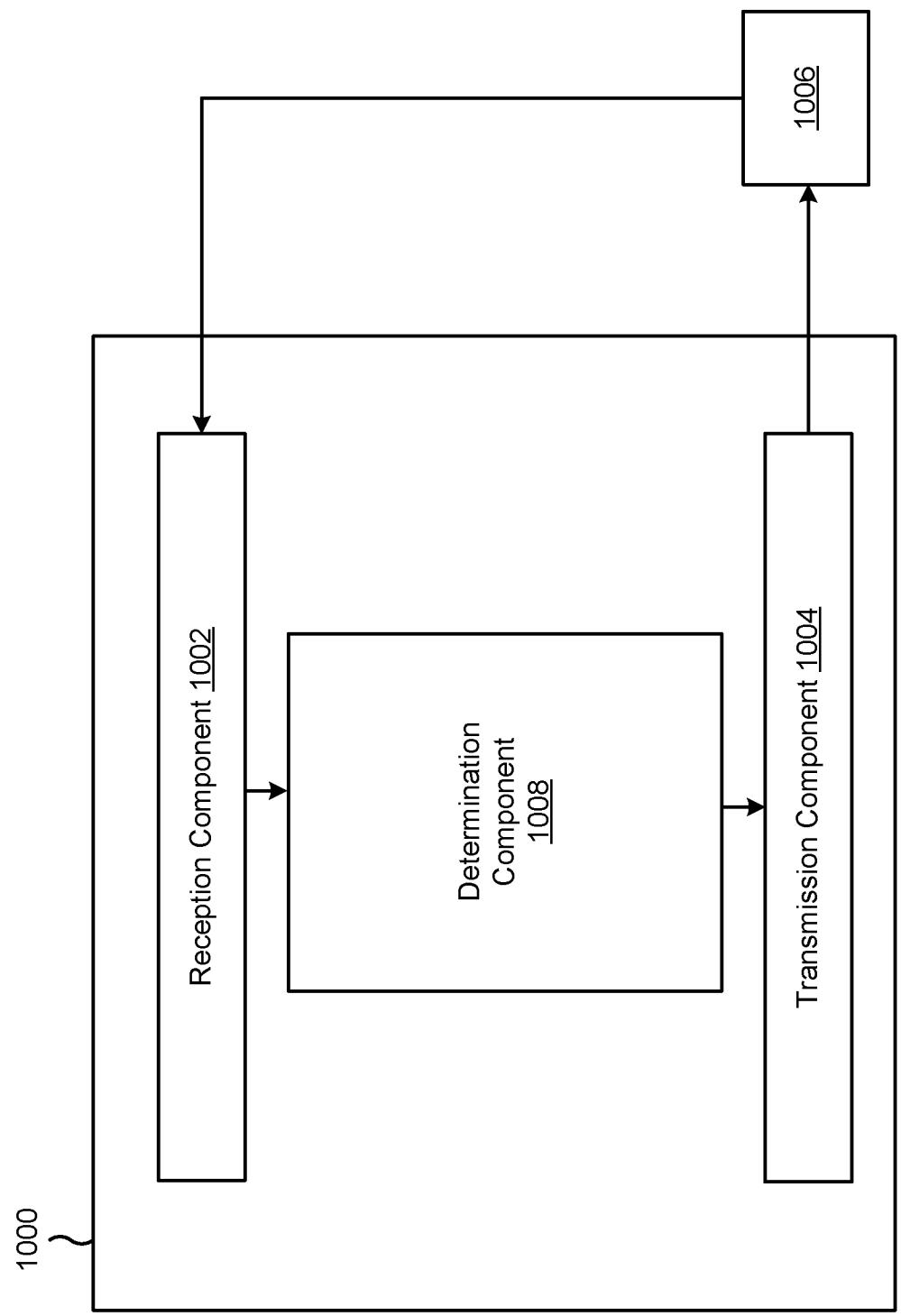

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive an indication that a UE has switched from communicating with a first TRP to communicating with a second TRP. The transmission component 1004 may transmit a differential beam pattern indication that indicates beam pattern information corresponding to a comparison between a first SSB beam pattern associated with the first TRP and a second SSB beam pattern associated with the second TRP. The transmission component 1004 may transmit an indication of the first SSB beam pattern.

The transmission component 1004 may transmit a decoder portion of a machine learning component. The determination component 1008 may encode, using an encoder portion of the machine learning component, a differential beam pattern to obtain an encoded differential beam pattern, wherein the beam pattern information comprises the encoded differential beam pattern. The determination component 1008 may train the machine learning component. In some aspects, the determination component 1008 may include one or more antennas, a modulator, a transmit MIMO processor, a transmit processor, a controller/processor, a memory, or a combination thereof, of the base station described above in connection with FIG. 2. In some aspects, the determination component 1008 may include the reception component 1002 and/or the transmission component 1004.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a differential beam pattern indication that indicates beam pattern information corresponding to a comparison between a first synchronization signal block (SSB) beam pattern associated with a first transmit receive point (TRP) and a second SSB beam pattern associated with a second TRP; and receiving an SSB associated with the second TRP based at least in part on the differential beam pattern indication.

Aspect 2: The method of Aspect 1, wherein the beam pattern information indicates that the second SSB beam pattern is the same as the first SSB beam pattern.

Aspect 3: The method of Aspect 1, wherein the beam pattern information indicates that the second SSB beam pattern is different than the first SSB beam pattern.

Aspect 4: The method of Aspect 3, further comprising re-training, based at least in part on the beam pattern information, a trained machine learning component.

Aspect 5: The method of any of Aspects 1, 3, or 4, wherein the beam pattern information indicates a difference between the second SSB beam pattern and the first SSB beam pattern.

Aspect 6: The method of Aspect 5, further comprising: receiving an indication of the first SSB beam pattern; and determining the second SSB beam pattern based at least in part on the difference between the second SSB beam pattern and the first SSB beam pattern.

Aspect 7: The method of any of Aspects 1-6, further comprising: receiving a decoder portion of a machine learning component, wherein the beam pattern information comprises an encoded differential beam pattern; and decoding, using the decoder portion of the machine learning component, the encoded differential beam pattern to obtain a differential beam pattern.

Aspect 8: The method of Aspect 7, wherein machine learning component comprises an autoencoder.

Aspect 9: The method of any of Aspects 1-8, wherein receiving the differential beam pattern indication comprises receiving the differential beam pattern indication from a base station.

Aspect 10: The method of Aspect 9, wherein the base station is associated with at least one of the first TRP or the second TRP.

Aspect 11: The method of either of Aspects 9 or 10, wherein the base station is associated with one of the first TRP or the second TRP, and wherein an additional base station is associated with the other of the first TRP or the second TRP.

Aspect 12: A method of wireless communication performed by a base station, comprising: receiving an indication that a user equipment (UE) has switched from communicating with a first transmit receive point (TRP) to communicating with a second TRP; and transmitting a differential beam pattern indication that indicates beam pattern information corresponding to a comparison between a first synchronization signal block (SSB) beam pattern associated with the first TRP and a second SSB beam pattern associated with the second TRP.

Aspect 13: The method of Aspect 12, wherein the beam pattern information indicates that the second SSB beam pattern is the same as the first SSB beam pattern.

Aspect 14: The method of Aspect 12, wherein the beam pattern information indicates that the second SSB beam pattern is different than the first SSB beam pattern.

Aspect 15: The method of either of Aspects 12 or 14, wherein the beam pattern information indicates a difference between the second SSB beam pattern and the first SSB beam pattern.

Aspect 16: The method of Aspect 15, further comprising transmitting an indication of the first SSB beam pattern.

Aspect 17: The method of any of Aspects 12-16, further comprising: transmitting a decoder portion of a machine learning component; and encoding, using an encoder portion of the machine learning component, a differential beam pattern to obtain an encoded differential beam pattern, wherein the beam pattern information comprises the encoded differential beam pattern.

Aspect 18: The method of Aspect 17, wherein the machine learning component comprises an autoencoder.

Aspect 19: The method of either of Aspects 17 or 18, further comprising training the machine learning component.

Aspect 20: The method of Aspect 19, wherein training the machine learning component comprises training the machine learning component in cooperation with at least one additional base station.

Aspect 21: The method of any of Aspects 12-20, wherein the base station is associated with at least one of the first TRP or the second TRP.

Aspect 22: The method of any of Aspects 12-21, wherein the base station is associated with one of the first TRP or the second TRP, and wherein an additional base station is associated with the other of the first TRP or the second TRP.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the memory and the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the memory and the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a differential beam pattern indication that indicates beam pattern information corresponding to a comparison between a first synchronization signal block (SSB) beam pattern associated with a first transmit receive point (TRP) and a second SSB beam pattern associated with a second TRP; and
        receive an SSB associated with the second TRP based at least in part on the differential beam pattern indication.

2. The UE of claim 1, wherein the beam pattern information indicates that the second SSB beam pattern is the same as the first SSB beam pattern.

3. The UE of claim 1, wherein the beam pattern information indicates that the second SSB beam pattern is different than the first SSB beam pattern.

4. The UE of claim 3, wherein the one or more processors are further configured to re-train, based at least in part on the beam pattern information, a trained machine learning component.

5. The UE of claim 1, wherein the beam pattern information indicates a difference between the second SSB beam pattern and the first SSB beam pattern.

6. The UE of claim 5, wherein the one or more processors are further configured to:
    receive an indication of the first SSB beam pattern; and
    determine the second SSB beam pattern based at least in part on the difference between the second SSB beam pattern and the first SSB beam pattern.

7. The UE of claim 1, wherein the one or more processors are further configured to:
    receive a decoder portion of a machine learning component, wherein the beam pattern information comprises an encoded differential beam pattern; and
    decode, using the decoder portion of the machine learning component, the encoded differential beam pattern to obtain a differential beam pattern.

8. The UE of claim 7, wherein machine learning component comprises an autoencoder.

9. The UE of claim 1, wherein the one or more processors, to receive the differential beam pattern indication, are configured to receive the differential beam pattern indication from a base station.

10. The UE of claim 9, wherein the base station is associated with at least one of the first TRP or the second TRP.

11. The UE of claim 9, wherein the base station is associated with one of the first TRP or the second TRP, and wherein an additional base station is associated with the other of the first TRP or the second TRP.

12. A base station for wireless communication, comprising:
    a memory; and
    one or more processors, coupled to the memory, configured to:

receive an indication that a user equipment (UE) has switched from communicating with a first transmit receive point (TRP) to communicating with a second TRP; and transmit a differential beam pattern indication that indicates beam pattern information corresponding to a comparison between a first synchronization signal block (SSB) beam pattern associated with the first TRP and a second SSB beam pattern associated with the second TRP.

13. The base station of claim 12, wherein the beam pattern information indicates that the second SSB beam pattern is the same as the first SSB beam pattern.

14. The base station of claim 12, wherein the beam pattern information indicates that the second SSB beam pattern is different than the first SSB beam pattern.

15. The base station of claim 12, wherein the beam pattern information indicates a difference between the second SSB beam pattern and the first SSB beam pattern.

16. The base station of claim 15, wherein the one or more processors are further configured to transmit an indication of the first SSB beam pattern.

17. The base station of claim 12, wherein the one or more processors are further configured to:
transmit a decoder portion of a machine learning component; and
encode, using an encoder portion of the machine learning component, a differential beam pattern to obtain an encoded differential beam pattern, wherein the beam pattern information comprises the encoded differential beam pattern.

18. The base station of claim 17, wherein the machine learning component comprises an autoencoder.

19. The base station of claim 17, wherein the one or more processors are further configured to train the machine learning component.

20. The base station of claim 19, wherein the one or more processors, to train the machine learning component, are configured to train the machine learning component in cooperation with at least one additional base station.

21. The base station of claim 12, wherein the base station is associated with at least one of the first TRP or the second TRP.

22. The base station of claim 12, wherein the base station is associated with one of the first TRP or the second TRP, and wherein an additional base station is associated with the other of the first TRP or the second TRP.

23. A method of wireless communication performed by a user equipment (UE), comprising:
receiving a differential beam pattern indication that indicates beam pattern information corresponding to a comparison between a first synchronization signal block (SSB) beam pattern associated with a first transmit receive point (TRP) and a second SSB beam pattern associated with a second TRP; and
receiving an SSB associated with the second TRP based at least in part on the differential beam pattern indication.

24. The method of claim 23, wherein the beam pattern information indicates that the second SSB beam pattern is different than the first SSB beam pattern.

25. The method of claim 23, wherein the beam pattern information indicates a difference between the second SSB beam pattern and the first SSB beam pattern.

26. The method of claim 25, further comprising:
receiving an indication of the first SSB beam pattern; and
determining the second SSB beam pattern based at least in part on the difference between the second SSB beam pattern and the first SSB beam pattern.

27. The method of claim 23, further comprising:
receiving a decoder portion of a machine learning component, wherein the beam pattern information comprises an encoded differential beam pattern; and
decoding, using the decoder portion of the machine learning component, the encoded differential beam pattern to obtain a differential beam pattern.

28. A method of wireless communication performed by a base station, comprising:
receiving an indication that a user equipment (UE) has switched from communicating with a first transmit receive point (TRP) to communicating with a second TRP; and
transmitting a differential beam pattern indication that indicates beam pattern information corresponding to a comparison between a first synchronization signal block (SSB) beam pattern associated with the first TRP and a second SSB beam pattern associated with the second TRP.

29. The method of claim 28, further comprising:
transmitting a decoder portion of a machine learning component; and
encoding, using an encoder portion of the machine learning component, a differential beam pattern to obtain an encoded differential beam pattern, wherein the beam pattern information comprises the encoded differential beam pattern.

30. The method of claim 29, further comprising training the machine learning component in cooperation with at least one additional base station.

* * * * *